United States Patent [19]

Munier et al.

[11] Patent Number: 4,587,426
[45] Date of Patent: May 6, 1986

[54] PHOTOSENSITIVE DEVICE FOR INFRARED RADIATION

[75] Inventors: Bernard Munier, Seyssinet Pariset; Marc Arques, Grenoble, both of France

[73] Assignee: Thomson-CSF, Paris, France

[21] Appl. No.: 670,552

[22] Filed: Nov. 9, 1984

[30] Foreign Application Priority Data

Nov. 15, 1983 [FR] France ................................ 83 18126

[51] Int. Cl.$^4$ ............................................. G01J 1/00
[52] U.S. Cl. .................................... 250/338; 250/370
[58] Field of Search .................. 250/330, 332, 338 R, 250/338 SE, 370 J, 370 K, 352

[56] References Cited

U.S. PATENT DOCUMENTS

| 4,004,148 | 1/1977 | Howard et al. | 250/338 SE |
| 4,443,701 | 4/1984 | Bailey | 250/338 SE |
| 4,529,884 | 7/1985 | Wolicki et al. | 250/370 E |

FOREIGN PATENT DOCUMENTS 2079093 1/1982 United Kingdom.

OTHER PUBLICATIONS

Electronics Letters, vol. 18, No. 7, Apr. 1982 (Londres, GB) R. A. Ballingall et al.: "Electronically Scanned CMT Detector ...".
Patents Abstracts of Japan, vol. 7, No. 178(E191) (1323) Aug. 6, 1983, & JP-A-58-93 477 (Pioneer K.K.) (5-1-9-1983).
Microelectronics Journal, vol. 10, No. 1, May–Jun. 1979, MacKintosh Publ. Ltd (Luton, US) C. Tassell et al.: "Photodiode Arrays–Characteristics ...".

*Primary Examiner*—Janice A. Howell
*Attorney, Agent, or Firm*—Roland Plottel

[57] ABSTRACT

In a device comprising N lines and M columns of infrared-sensitive photodiodes, the charges derived from the detectors of one column are integrated in a first series of capacitors. MOS transistors connect the first series of capacitors to a second series in order to produce a distribution of charges between these capacitors. MOS transistors mounted as emitter-followers read the level of charges within the second capacitors while integration of the charges takes place in the first capacitors of the detectors of the next column. The detectors and the remainder of the device are integrated on two different semiconductor substrates but the device as a whole is integrated in one cryostat having a single output.

15 Claims, 4 Drawing Figures

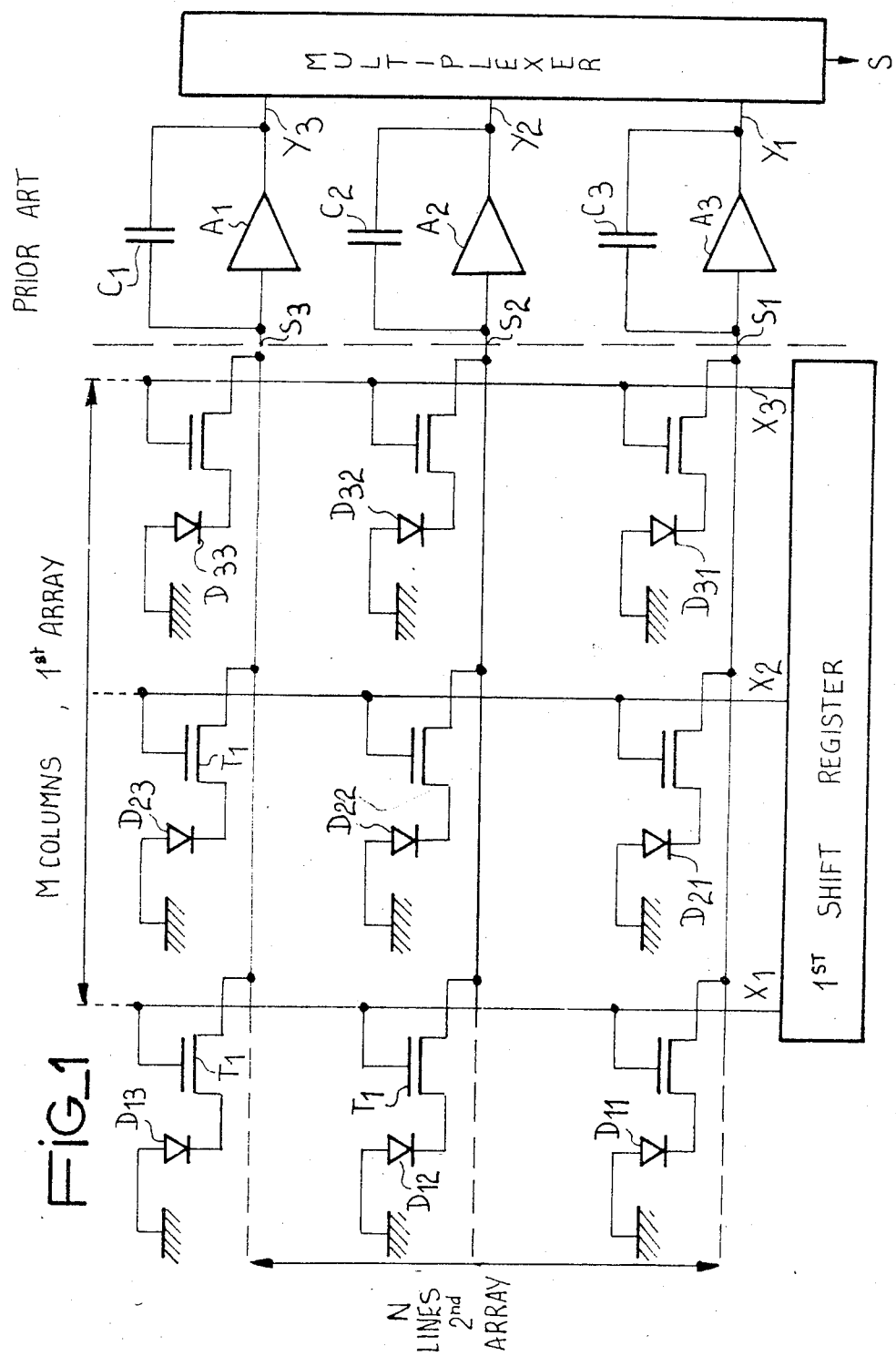

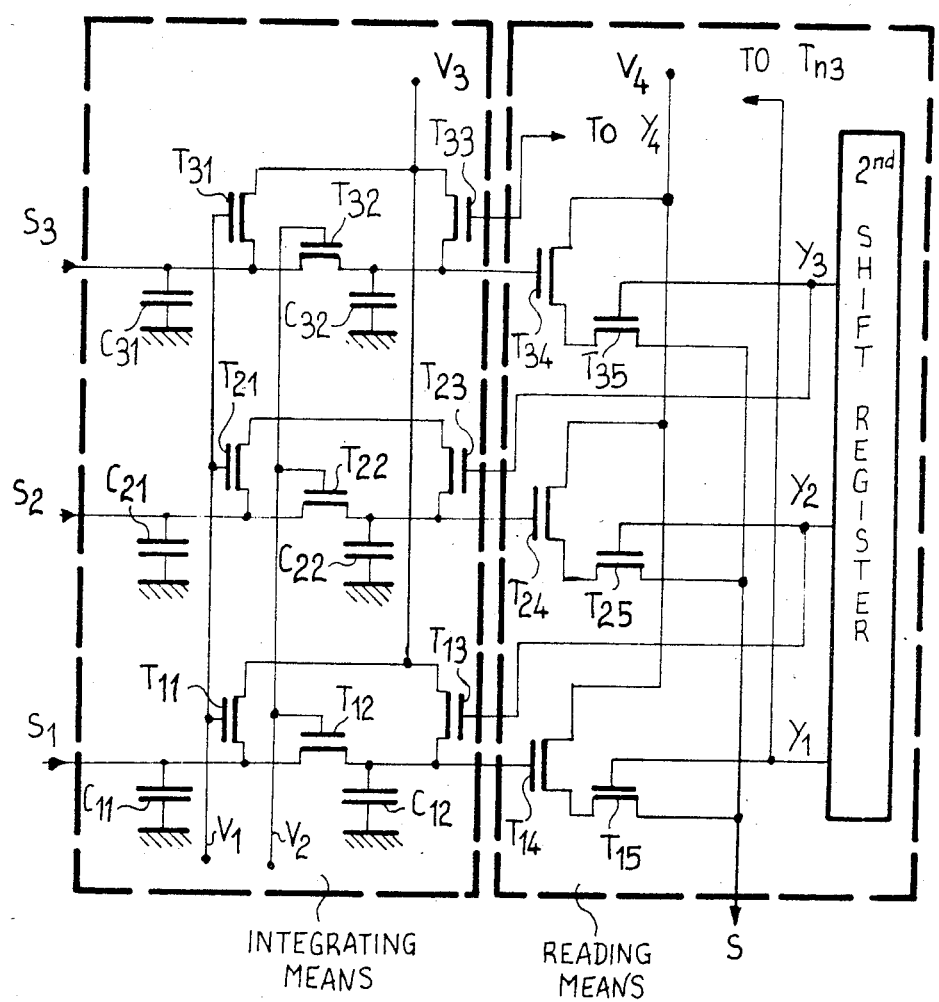

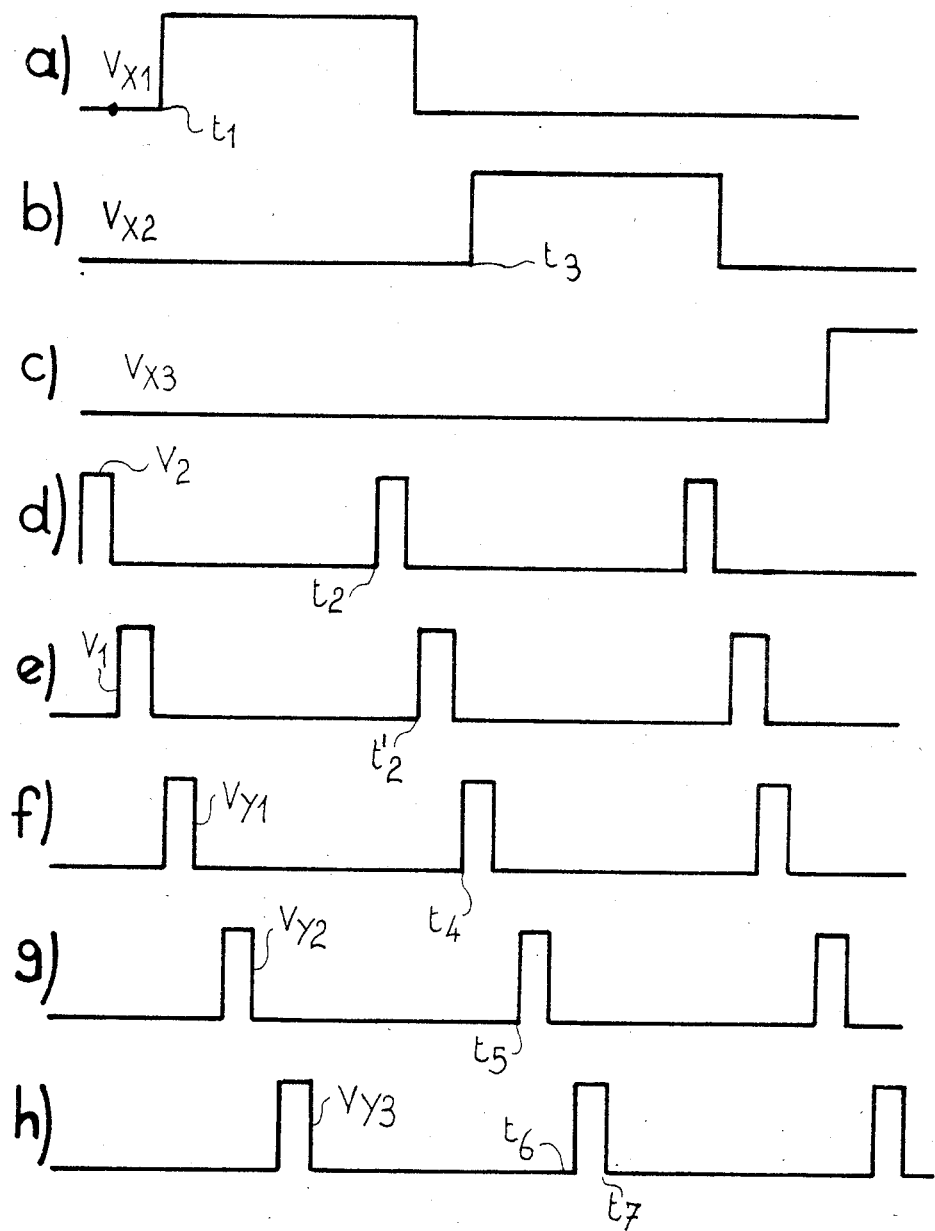

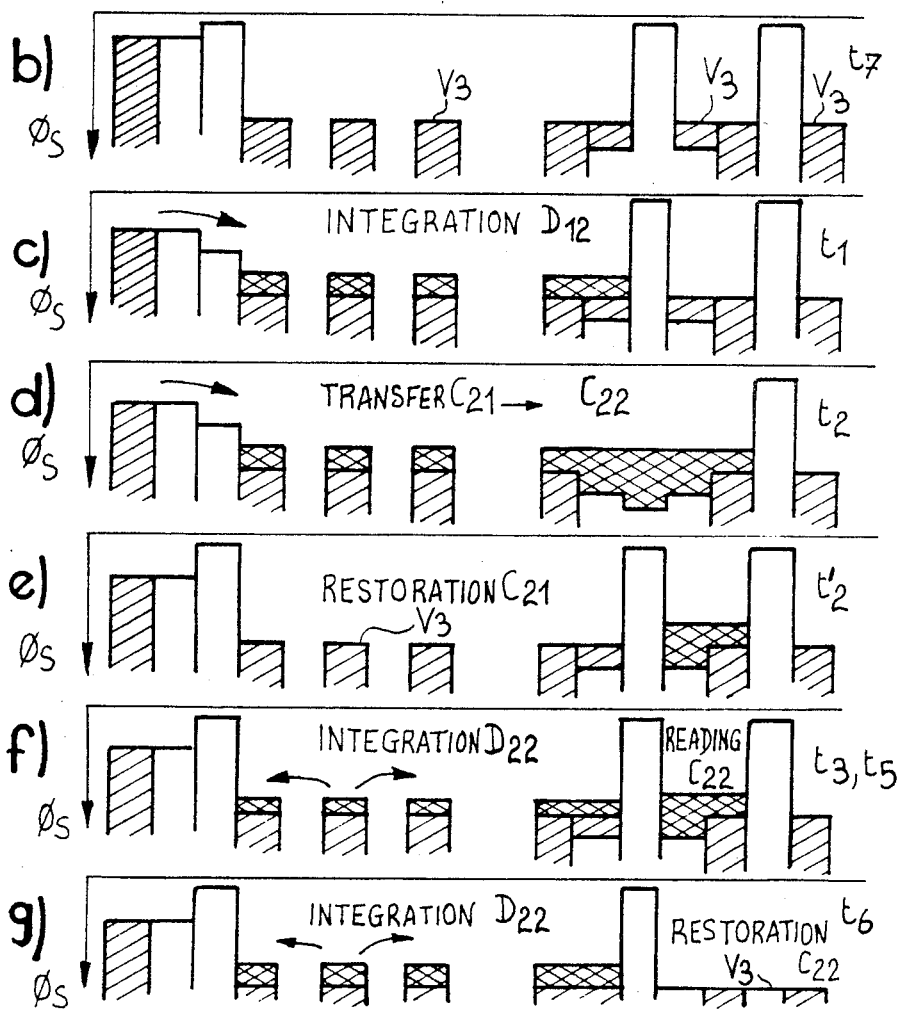
FIG_4

PHOTOSENSITIVE DEVICE FOR INFRARED RADIATION

BACKGROUND OF THE INVENTION

1. Field of the Invention

The present invention relates to a photosensitive device for infrared radiation.

2. Description of the Prior Art

An infrared-sensitive device was disclosed in an article entitled "Electronically scanned C.M.T. detector array for the 8-14 μm band" and published in the issue dated Apr. 1st 1982 of "Electronics Letters", volume 18, No 7, pages 285 to 287. This device will be described with reference to FIG. 1 of the accompanying drawings.

This known device comprises a lattice network of N lines and M columns of infrared detectors integrated on a semiconductor substrate. The detectors $D_{11}$, $D_{21}$, $D_{31}$ ..., $D_{12}$, $D_{22}$, $D_{32}$ ... are photodiodes integrated on a semiconductor substrate of cadmium, mercury and telluride (C.M.T.). An MOS transistor $T_1$ is associated with each photodiode. It is apparent from FIG. 1 that the anode of each photodiode is connected to ground and its cathode is connected to an MOS transistor $T_1$. A first array of vertical electrodes connects the gates of the MOS transistors which are associated with the detectors of one and the same column. A second array of horizontal electrodes connects the MOS transistors which are associated with the detectors of one and the same line. A first shift register serves to address successively each electrode of the first array. When an electrode of the first array is addressed, there takes place an integration of the charges corresponding to the infrared radiation received by the detectors which are connected to this electrode, for example the detectors $D_{11}$, $D_{12}$, $D_{13}$ in FIG. 1. Integration of the charges is performed by operational amplifiers which are mounted as integrators, with a capacitor $C_1$, $C_2$, $C_3$ between their negative input and their output, and which are connected to each electrode of the second array. A multiplexer receives the outputs of the amplifiers and delivers a signal S for serial reading of the charges integrated in the detectors of one column. Integration of the charges of the detectors $D_{21}$, $D_{22}$, $D_{23}$ of the following column then begins.

The first MOS transistors $T_1$ as well as the first shift register are integrated on a semiconductor substrate of silicon, said substrate being interconnected with the substrate which carries the infrared detectors. The first MOS transistors $T_1$ and the first shift register are placed within the same cryostat as the infrared detectors, said cryostat being brought to a temperature of 77 K.

The problem which arises and has now been solved by the present invention lies in the fact that the operational amplifiers mounted as integrators cannot be placed within the cryostat. Since they have high power consumption and therefore attain high operating temperatures, this would make it difficult to place them within the cryostat. In addition, it is on account of their high power consumption that these amplifiers are constructed in the form of discrete components and are cumbersome.

As a consequence, it is necessary to establish a large number of connections between the cryostat and the remainder of the device. Furthermore, the connections between the cryostat and the operational amplifiers carry low-level signals which are sensitive to transient disturbances.

SUMMARY OF THE INVENTION

The present invention provides a solution to this problem. The operation of the photosensitive device for infrared radiation in accordance with the invention is comparable with that of the device described in the article cited in the foregoing but differs from this latter in that the cryostat is provided with only one output having a high voltage level and a low impedance.

As stated in claim 1 hereinafter, the present invention relates to a photosensitive device for infrared radiation comprising:

a network of N lines and M columns of infrared detectors integrated on a first semiconductor substrate;

a first MOS transistor connected to each detector and to two electrode arrays in which one array connects the MOS transistors associated with the detectors of one line and the other array connects the transistors associated with the detectors of one column, and a first shift register which successively addresses the electrodes of a first array, the MOS transistors and the register being integrated on a second semiconductor substrate and placed within a cryostat with the detectors;

means connected to each electrode of the second array for carrying out integration of the charges corresponding to the radiation received by the detectors connected to each electrode of the first array and for carrying out serial reading of the integrated charges.

The invention is distinguished by the fact that the integrating and reading means aforesaid comprise the following elements which are integrated in the second semiconductor substrate and placed within the cryostat:

two capacitors and a second MOS transistor connected to each electrode of the second array, integration of the charges being performed by the first capacitor whereupon the second MOS transistor connects the first and the second capacitor in order to produce a distribution of the charges beneath the first and the second capacitor;

means for carrying out serial reading of the level of charges in the second capacitors during integration within the first capacitors of the charges of the detectors connected to the following electrode of the first array.

BRIEF DESCRIPTION OF THE DRAWINGS

Other features of the invention will be more apparent upon consideration of the following description and accompanying drawings, wherein:

FIG. 1 is a diagram of a photosensitive device for infrared radiation in accordance with the prior art;

FIG. 2 is a diagram of one embodiment of the integrating and reading means in accordance with the invention;

FIGS. 3a to 3h illustrate one example of timing of control signals of the device in accordance with the invention;

FIGS. 4a to 4g are cross-sectional views showing one embodiment of the device in accordance with the invention and schematic diagrams which explain the operation of said device.

In the different figures, the same references designate the same elements but the dimensions and proportions of the various elements are not observed for the sake of enhanced clarity.

FIG. 1 has already been described in the introductory part of this specification.

In FIG. 1, a dashed vertical line forms a separation between the left-hand elements which consist of detectors, first MOS transistors, first shift register, and which are placed within the cryostat, and the right-hand elements which consist of integrating and reading means and are located outside the cryostat.

DESCRIPTION OF THE PREFERRED EMBODIMENTS

In the diagram shown in FIG. 2 and representing one embodiment in accordance with the invention, the integrating and reading means are placed within the cryostat and integrated on the same semiconductor substrate as the first MOS transistors $T_1$ and the first shift register. The remainder of the photosensitive device is the same as in FIG. 1.

Each electrode of the second array $S_1$, $S_2$, $S_3$ . . . (although lines are shown in the figures, it would be equally possible to have an array of columns) is connected to two capacitors and to a second MOS transistor. Thus the electrode $S_1$ is connected to a first capacitor $C_{11}$, said capacitor being connected between said electrode $S_1$ and a reference potential which can be that of the semiconductor substrate which carries the integrating and reading means. In the figures, this potential is represented by the conventional "ground" symbol. A second MOS transistor $T_{12}$ separates the first capacitor $C_{11}$ from a second capacitor $C_{12}$ connected between one electrode of the transistor $T_{12}$ and the reference potential. The other electrodes $S_2$, $S_3$ . . . are connected to capacitors $C_{21}$, $C_{22}$, $C_{31}$, $C_{32}$ . . . and to second MOS transistors $T_{22}$, $T_{32}$ . . .

A control voltage $V_2$ having the same value is applied to the gates of the second MOS transistors.

The charges derived from the detectors of one and the same column are simultaneously integrated in the first capacitors, whereupon the second MOS transistors connect the first and the second capacitors and the level of charges is read from the second capacitors whilst integration of charges of the detectors of the following column begins within the first capacitors.

FIGS. 3a to 3h illustrate one mode of timing of control signals of the device in accordance with the invention.

FIGS. 3a, 3b, 3c show the voltages $V_{X1}$, $V_{X2}$, $V_{X3}$ applied to the columns $X_1$, $X_2$, $X_3$ by the first shift register. Each of these voltages undergoes a periodic transition to the high level. Each column $X_1$, $X_2$, $X_3$ . . . is therefore addressed successively.

Thus, at the instant $t_1$, the transition of the voltage $V_{X1}$ to the high level initiates conduction of the first MOS transistors $T_1$ of the first column of detectors $X_1$. The charges created in these detectors by the incident infrared radiation are stored in the first capacitors $C_{11}$, $C_{21}$, $C_{31}$ . . .

At the instant $t_2$, the transition of the control voltage $V_2$ to the high level (as shown in FIG. 3d) initiates conduction of the second MOS transistors $T_{12}$, $T_{22}$, $T_{32}$ . . . The first and the second capacitors are connected together and the charges of each first capacitor are distributed beneath the first and the second capacitor.

At the instant $t_3$, the transition of the voltage $V_{X2}$ to the high level initiates integration in the first capacitors $C_{11}$, $C_{21}$, $C_{31}$ of the charges of the detectors of the second column $X_2$ and so on in sequence. The charges of one column of detectors are integrated whereas the charges of the previous column are read.

In FIG. 2, the integrating means which have just been described are connected to reading means which comprise in the case of each line a third MOS transistor and a fourth MOS transistor $T_{14}$ and $T_{15}$, $T_{24}$ and $T_{25}$ . . . The third MOS transistors are mounted as emitter-followers, the gates of which are connected to the second capacitors. The gates of the fourth MOS transistors are connected to the outputs $Y_1$, $Y_2$, $Y_3$ . . . of the second shift register and are connected between a third MOS transistor and the high-level output S of the device.

In FIGS. 3f, 3g, 3h, there are shown the voltages $V_{y1}$, $V_{y2}$, $V_{y3}$ at the outputs $Y_1$, $Y_2$, $Y_3$ of the second shift register.

At the interval $t_4$, the transition of the voltage $V_{y1}$ to the high level initiates conduction of the fourth MOS transistor $T_{15}$ which delivers at the output S the signal for reading the charges integrated by the detector $D_{11}$. Reading of the charges integrated by the detector $D_{12}$ begins at the instant $t_5$ and reading of the charges integrated by the detector $D_{13}$ begins at the instant $t_6$ during integration (which has taken place since the instant $t_3$) of the charges derived from the detectors $D_{21}$, $D_{22}$, $D_{23}$ . . . in the first capacitors.

Transistors for level-restoration of the first and second capacitors are also shown in FIG. 2.

Said transistors are designated by the references $T_{11}$ and $T_{13}$ in the case of the first line $S_1$ and by the references $T_{21}$ and $T_{23}$ in the case of the second line $S_2$ . . . These transistors are connected to one of the capacitors and to a constant control voltage $V_3$. The gate of the transistors connected to the first capacitors is controlled by a square-wave control signal $V_1$ as shown in FIG. 3e. In the case of the transistors connected to the second capacitors, the gate of each transistor is connected to one output of the second read register. For example, the transistor $T_{13}$ receives the control signal $V_{y2}$, the transistor $T_{23}$ receives the control signal $V_{y3}$ . . . and so on in sequence.

FIG. 4a is a transverse sectional view of the semiconductor substrate of p-type silicon, for example, on which is integrated one embodiment of the device in accordance with the invention, with the exception of the photodetectors.

This cross-section has been taken at the level of the elements which are connected to the photodiode $D_{12}$.

The anode of said photodiode is connected to a reference potential represented by the "ground" symbol in the figure and its cathode is connected to a first MOS transistor $T_1$ constituted by two diodes $d_1$, $d_2$ and by two gates. The first gate $G_1$ is brought to a constant potential and contributes to biasing of the photodiode. The second gate receives the signal $V_{X1}$ derived from the first shift register.

A horizontal electrode provides a connection between the diodes $d_2$ of the transistors $T_1$ of one and the same line. This connection terminates at a diode $d_3$ which forms part of the MOS transistor $T_{22}$. This transistor has three gates, namely a gate $G_2$ and a gate $G_3$ at a constant potential which surround a gate for receiving the control signal $V_2$.

The transistor $T_{23}$ follows the transistor $T_{22}$, its gate receives the control signal $V_{y3}$ and it comprises the diode $d_4$ which is common with the transistor $T_{22}$ and a diode $d_5$ which receives the signal $V_3$.

The first capacitor $C_{21}$ is constituted by the capacitors of all the diodes $d_2$ of the transistors $T_1$ of the second line in addition to the capacitor beneath the diode $d_3$ and the gate $G_2$.

The second capacitor $C_{22}$ is constituted by the capacitors beneath the gate $G_3$ and the diode $d_4$.

In FIG. 4a, there have not been shown the transistor $T_{21}$ connected to the diode $d_3$, the transistors $T_{23}$, $T_{24}$, $T_{25}$ and the second shift register which are connected to the diode $d_4$.

FIGS. 4b to 4g show the time-dependent variation of surface potentials within the semiconductor substrate.

FIG. 4b shows the situation prior to any integration. The capacitors $C_{21}$, $C_{22}$ and the diode $d_5$ are at the potential $V_3$.

At the instant $t_1$ (as shown in FIG. 4c), the signal $V_{X1}$ undergoes a transition to the high level, the first MOS transistor $T_1$ changes to the conducting state and the charges derived from the photodiode $D_{12}$ are stored within the capacitor $C_{21}$.

At the instant $t_2$ (as shown in FIG. 4d), the signal $V_2$ undergoes a transition to the high level, the transistor $T_{22}$ is caused to conduct and the same potential level is established between the capacitors $C_{21}$ and $C_{22}$. There is a transfer of part of the charges stored within the capacitor $C_{21}$ beneath the capacitor $C_{22}$ in order to obtain the same level of charges within the capacitor $C_{22}$.

At the instant $t'_2$ (as shown in FIG. 4e), the signal $V_{X1}$ is at the low level, the MOS transistor $T_1$ is caused to cut-off, and integration of the charges derived from the photodiode $D_{12}$ is completed. The signal $V_2$ is at the low level, the MOS transistor $T_{22}$ is cut-off and the capacitors $C_{12}$ and $C_{22}$ are separated. The signal $V_1$ changes to the high level (as shown in FIG. 3e), the transistor $T_{21}$ is caused to conduct and restores the first capacitor $C_{21}$ to the potential $V_3$.

At the instant $t_3$ (as shown in FIG. 4f), the signal $V_{X2}$ changes to the high level. Integration of the charges derived from the photodiode $D_{22}$ (not shown) then begins.

At the instant $t_5$, the signal $V_{Y2}$ changes to the high level. The transistor $T_{25}$ is caused to conduct and the level of charges within the capacitor $C_{22}$ is read by the transistor $T_{24}$.

At the instant $t_6$, the signal $V_{Y3}$ undergoes a transition to the high level, the transistor $T_{23}$ changes to the conducting state and restores the capacitor $C_{22}$ to the level $V_3$ whilst integration of charges continues within the capacitor $C_{21}$.

It is possible to restore the second capacitors to the level $V_3$ simultaneously once they have all been read.

In accordance with an alternative embodiment of the invention, the reading means can be constituted by a charge-coupled shift register having parallel inputs and a series output. This register is accordingly integrated in the semiconductor substrate so as to follow the transistors $T_{21}$, $T_{22}$... In this case, neither the second shift register nor the transistors $T_{14}$, $T_{15}$, $T_{24}$, $T_{25}$... are employed.

The charges are transferred into the charge-coupled register up to a charge-reading device, the output of which constitutes the high-level output of the photosensitive device.

It is possible either to establish the same charge level between the first and the second capacitors and then between the second capacitors and the charge-coupled register or to establish simultaneously the same charge level between the first capacitors and the charge-coupled register. In this case the second capacitors are essentially constituted by the capacitors of the storage electrodes of the charge-coupled register.

The infrared-sensitive detectors can be photodiodes as shown in the figures or any other type of infrared detector such as, for example, a detector of the gate-insulator-semiconductor type.

In the case of photodiodes, they can be connected either to a diode formed on the second semiconductor substrate as shown in the figures or to a gate formed on said second substrate without thereby modifying the operation of the device in accordance with the invention. By way of example, the photodiodes can be connected to one gate of a first MOS transistor $T_1$ having another gate connected via a common electrode to the transistors $T_1$ of one and the same column.

Similarly, the photodetectors and the remainder of the device are integrated on different and well-suited semiconductor substrates. In the case of photodetectors, examples of these substrates include indium antimonide, tin and lead telluride, cadmium and mercury telluride, and so on. The remainder of the device is integrated for example on a semiconductor substrate of p-type or n-type silicon.

Finally, it is readily apparent that the functions of the electrodes of the first array and of the second array of electrodes can be reversed without any difficulty. In other words, the first shift register can be connected to the electrodes of the first array and the integrating and reading means in accordance with the invention can be connected to the electrodes of the second array.

What is claimed is:

1. A photosensitive device for infrared radiation comprising:

a network of N lines and M columns of infrared detectors integrated on a first semiconductor for substrate;

a first MOS transistor connected to each detector and to a first and a second electrode arrays in which one array connects the MOS transistors associated with the detectors of one line and the other array connects the transistors associated with the detectors of one column, and a first shift register which successively addresses the electrodes of the first electrode array, the MOS transistors and the register being integrated on a second semiconductor substrate and placed within a cryostat with the detectors;

means connected to each electrode of the second electrode array for carrying out integration of the charges corresponding to the radiation received by the detectors connected to each electrode of the first array and for carrying out serial reading of the integrated charges, wherein said means comprise the following elements which are integrated in the second semiconductor substrate and placed within the cryostat:

a first capacitor connected to each electrode of the second array, integration of the charges corresponding to the radiation received by the detectors connected to the electrode of the first array addressed by the first shift register being performed by said first capacitor, said first capacitor being connected to a second capacitor by a second MOS transistor in order to produce a distribution of the said charges beneath the first and the second capacitor;

means for carrying out serial reading in the second capacitors of the level of said charges during integration within the first capacitors of the charges corresponding to the radiation received by the detectors connected to the electrode of the first array addressed by the first shift register.

2. A device according to claim 1, wherein said device comprises means for level restoration of the first and second capacitors, said level restorations being performed in the case of the first capacitors after they have been connected to the second capacitors and in the case of the second capacitors after the level of charges within said second capacitors has been read.

3. A device according to claim 2, wherein said level-restoring means are constituted by an MOS transistor connected to each capacitor.

4. A device according to claim 1, wherein the means for carrying out serial reading of the charges contained in the second capacitors are constituted by:
a second shift register;
a third MOS transistor mounted as an emitter-follower which is connected to each second capacitor and to a fourth MOS transistor, each fourth MOS transistor being addressed periodically by the second shift register and provided with one electrode which is common with the fourth MOS transistors constituting the output of the device.

5. A device according to claim 1, wherein the means for carrying out serial reading of the charges are constituted by a charge-coupled shift register in which the charges are transferred up to a charge-reading device which provides the output of the photosensitive device.

6. A device according to claim 5, wherein the same level of charges is established simultaneously between the first capacitors and the charge-coupled register, the second capacitors being essentially constituted by the capacitors of the storage electrodes of said charge-coupled register.

7. A device according to claim 5, wherein the same level of charges is established between the first and the second capacitors, then between the second capacitors and the charge-coupled register.

8. A device according to claim 2, wherein the means for carrying out serial reading of the charges contained in the second capacitors are constituted by:
a second shift register;
a third MOS transistor mounted as an emitter-follower which is connected to each second capacitor and to a fourth MOS transistor, each fourth MOS transistor being addressed periodically by the second shift register and provided with one electrode which is common with the other fourth MOS transistors constituting the output of the device.

9. A device according to claim 3, wherein the means for carrying out serial reading of the charges contained in the second capacitors are constituted by:
a second shift register;
a third MOS transistor mounted as an emitter-follower which is connected to each second capacitor and to a fourth MOS transistor, each fourth MOS transistor being addressed periodically by the second shift register and provided with one electrode which is common with the other fourth MOS transistors constituting the output of the device.

10. A device according to claim 2, wherein the means for carrying out serial reading of the charges are constituted by a charge-coupled shift register in which the charges are transferred up to a charge-reading device which provides the output of the photosensitive device.

11. A device according to claim 3, wherein the means for carrying out serial reading of the charges are constituted by a charge-coupled shift register in which the charges are transferred up to a charge-reading device which provides the output of the photosensitive device.

12. A device according to claim 10, wherein the same level of charges is established simultaneously between the first capacitors and the charge-coupled register, the second capacitors being essentially constituted by the capacitors of the storage electrodes of said charge-coupled register.

13. A device according to claim 11, wherein the same level of charges is established simultaneously between the first capacitors and the charge-coupled register, the second capacitors being essentially constituted by the capacitors of the storage electrodes of said charge-coupled register.

14. A device according to claim 10, wherein the same level of charges is established between the first and the second capacitors, then between the second capacitors and the charge-coupled register.

15. A device according to claim 11, wherein the same level of charges is established between the first and the second capacitors, then between the second capacitors and the charge-coupled register.

* * * * *